(12) United States Patent
Hartmann

(10) Patent No.: US 8,955,994 B2
(45) Date of Patent: Feb. 17, 2015

(54) METHOD AND APPARATUS FOR CONTROLLING AN OUTSIDE REARVIEW MIRROR OF A VEHICLE FROM AN UNFOLDED POSITION TO A FOLDED POSITION

(71) Applicant: Audi AG, Ingolstadt (DE)

(72) Inventor: Jürgen Hartmann, Gutenstetten (DE)

(73) Assignee: Audi AG, Ingolstadt (DE)

( * ) Notice: Subject to any disclaimer, the term of this patent is extended or adjusted under 35 U.S.C. 154(b) by 190 days.

(21) Appl. No.: 13/757,167

(22) Filed: Feb. 1, 2013

(65) Prior Publication Data
US 2013/0293974 A1 Nov. 7, 2013

(30) Foreign Application Priority Data
May 3, 2012 (DE) .......... 10 2012 008 914

(51) Int. Cl.
G02B 5/08 (2006.01)
B60R 1/06 (2006.01)
B60R 1/074 (2006.01)
B60R 11/00 (2006.01)

(52) U.S. Cl.
CPC . B60R 1/06 (2013.01); B60R 1/074 (2013.01); B60R 2011/0007 (2013.01)
USPC .......................................... 359/841

(58) Field of Classification Search
CPC ...... B60R 25/04; B60R 25/104; B60R 25/33; B60R 1/06; B60R 1/074
USPC .......................................... 359/841, 843, 872
See application file for complete search history.

(56) References Cited

U.S. PATENT DOCUMENTS

2011/0141593 A1* 6/2011 Kanning et al. ............... 359/843

FOREIGN PATENT DOCUMENTS

| DE | 198 08 181 | 9/1999 |
| DE | 198 20 786 | 11/1999 |
| DE | 199 06 667 | 9/2000 |
| DE | 202005006903 | 10/2006 |
| DE | 102009049368 | 4/2011 |

* cited by examiner

Primary Examiner — Euncha Cherry
(74) Attorney, Agent, or Firm — Henry M. Feiereisen LLC

(57) ABSTRACT

A method and a device for controlling movement of an outside rearview mirror of a vehicle from an unfolded position to a folded position includes determining whether an ignition of a vehicle is turned off, and determining whether an object has been detected in a rear detection range of the vehicle. The mirror is moved into the folded position, when the ignition is turned off, and when either no object has been detected in the detection range, or when an object has been detected in the detection range and a seat associated with the mirror is unoccupied and/or a door associated with the mirror is opened. The vehicle has a seat occupancy sensor and a door switch.

8 Claims, 2 Drawing Sheets

METHOD AND APPARATUS FOR CONTROLLING AN OUTSIDE REARVIEW MIRROR OF A VEHICLE FROM AN UNFOLDED POSITION TO A FOLDED POSITION

CROSS-REFERENCES TO RELATED APPLICATIONS

This application claims the priority of German Patent Application, Serial No. 10 2012 008 914.7, filed May 3, 2012, pursuant to 35 U.S.C. 119(a)-(d), the content of which is incorporated herein by reference in its entirety as if fully set forth herein.

BACKGROUND OF THE INVENTION

The present invention relates to a method and an apparatus for controlling an outside rearview mirror of a vehicle from an unfolded position to a folded position.

Approaches for controlling a position of an outside rearview mirror of a vehicle are known, wherein the outside rearview mirror is folded depending whether an object is detected behind the vehicle. However, in certain driving situations, for example on narrow roads or in confined spaces, the driver of the vehicle may want to prevent the outside rearview mirror from folding, although a distance sensor or a proximity sensor tries to force the outside rearview mirror to fold due to a detected object.

It would therefore be desirable and advantageous to obviate prior art shortcomings and to provide an improved method for controlling an outside rearview mirror of a vehicle from an unfolded position to a folded position.

SUMMARY OF THE INVENTION

According to one aspect of the present invention, a method for controlling an outside rearview mirror of a vehicle from an unfolded position to a folded position is characterized in that, when using a proximity sensor for detecting an object in a detection range of the vehicle opposite the direction of travel, includes the following method steps:
a) Determining a first parameter indicating whether an ignition of a vehicle is turned off,
b) Determining a second parameter which indicates whether an object is detected in the detection range by the proximity sensor,
c1) Controllably moving the outside rearview mirror into its folded position, when the first parameter indicates that the ignition is turned off, and the second parameter indicates that no object has been detected in the detection range, or
c2) Determining a third parameter and controllably moving the outside rearview mirror into its folded position depending on the third parameter, when the first parameter indicates that the ignition is turned off, and the second parameter indicates an object in the detection range.

With this method of the invention, the outside rearview mirror is immediately folded when the ignition is turned off if the proximity sensor fails to detect an object in the rear detection range. The outside rearview mirror is thus folded, for example, when parking in a tight garage and when the ignition is turned off, thus allowing, for example, the driver to comfortably exit the vehicle. Because the proximity sensor monitors only the rear detection range, for example, a tight garage wall is not detected as an object, which would otherwise prevent the outside rearview mirror from being folded.

When an object is detected by the proximity sensor at the same time the ignition is turned off, the outside rearview mirror is folded in response to a third parameter, i.e. the outside rearview mirror thus initially remains in its operating state, thus allowing, for example the driver, to observe the traffic behind the vehicle and thus also the detected object.

According to an advantageous feature of the present invention, the third parameter may monitor whether a vehicle seat associated with the outside rearview mirror is occupied, wherein according to method step c2) the outside rearview mirror may be controlled into its folded position, when the third parameter indicates that the vehicle seat is unoccupied. The outside rearview mirror is then folded with a time delay after the ignition is tuned off. The occupancy of the vehicle seat is detected by a seat occupancy sensor.

According to another advantageous feature of the present invention, a delayed folding may also be realized with a third parameter that detects when a vehicle door associated with the outside rearview mirror is opened, so that in accordance with method step c2) the outside rearview mirror may be controlled into its folded position when the third parameter indicates that the vehicle door is opened. Opening of the vehicle door can be detected with a door contact switch.

If the third parameter fails to indicate any of the above operations, the outside rearview mirror is not folded.

Lastly, according to another aspect of the invention, the invention also relates to a device for controlling an outside rearview mirror of a vehicle from an unfolded position to a folded position by using a proximity sensor for detecting an object in a detection range opposite to the direction of travel of the vehicle, wherein the device is configured to carry out a method according to one of the preceding embodiments.

Such a device can typically be implemented by using components that already exist in modern vehicles because only software may need to be adapted.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
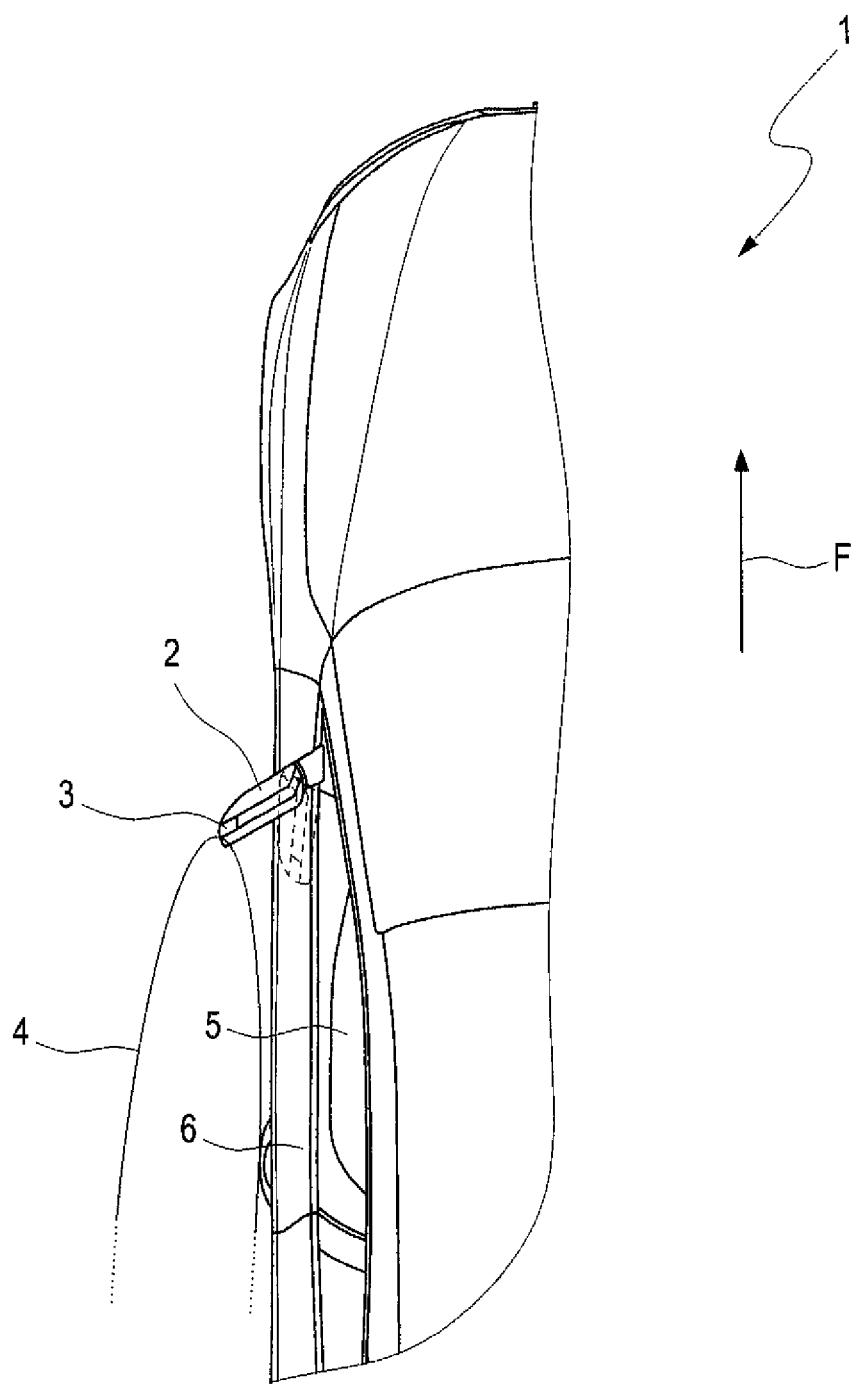
FIG. 1 shows a plan view of a partial outline of a vehicle with a device for performing the method according to the present invention.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a left side of a motor vehicle 1 having a left outside rearview mirror 2 and a proximity sensor 3. The mirror 2 can be adjusted automatically by an electric actuator mechanism from an unfolded position into a folded position (shown by dashed lines).

The proximity sensor 3 monitors with its detection range 4 the space behind the vehicle 1, which is oriented opposite to the direction of travel F of the vehicle 1.

Figure 2:
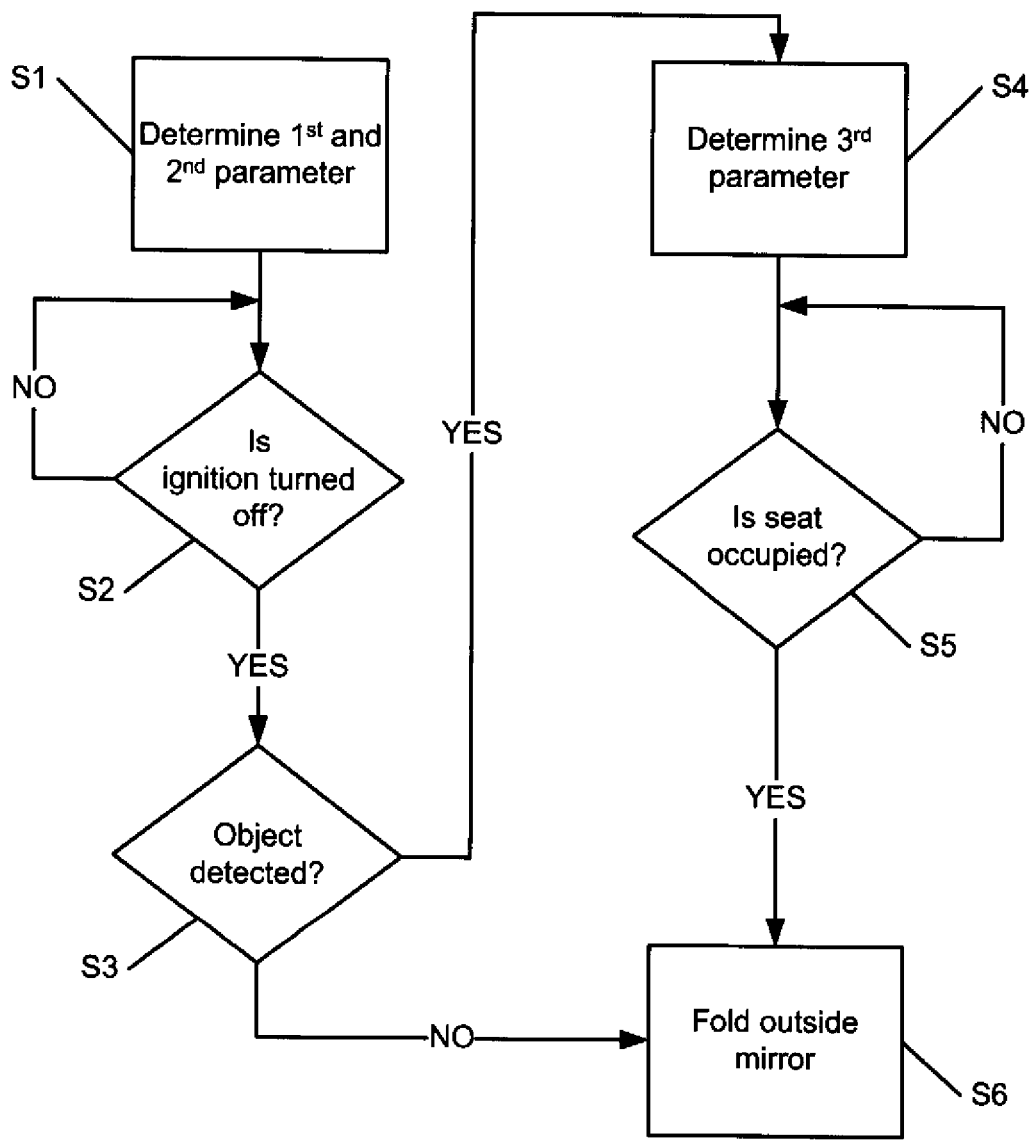
FIG. 2 shows a flowchart of a method according to the present invention.

Two operative states are distinguished for automatically folding the outside rearview mirror which will be explained with reference to the flow diagram according to FIG. 2. For this purpose, a first parameter and a second parameter are determined at a first step S1. The first parameter indicates whether the ignition of the vehicle 1 is turned off, whereas the second parameter indicates whether an object is detected in the detection range 4 by the proximity sensor 3.

If according to a second step S2 the ignition is turned off, it is checked at a further step S3 based on the second parameter, whether the proximity sensor 2 detects an object in the detection range 4. If the ignition is not turned off, the step S2 is repeated.

When it is determined at the step S3 that no object is detected in the detection range, the outside rearview mirror is in folded at final step S6.

Conversely, when it is determined at the step S3 that an object is present in the detection range 4, a third parameter is first determined at step S4. Depending on this third parameter, the outside rearview mirror 2 is folded with a time delay or kept in the unfolded position.

This third parameter detects with a seat occupancy sensor whether a vehicle seat 5 associated with the outside rearview mirror 2 is occupied. At step S5, it is determined whether the vehicle seat is occupied; if this is the case, this step S5 is repeated, until no occupancy is detected, whereafter according to the last step S6, the outside rearview mirror 2 is controlled to assume its folded position. If it is determined that the vehicle seat 5 is unoccupied, the outside rearview mirror 2 remains in its unfolded position.

Instead of detecting the seat occupancy for the third parameter, the third parameter can also detect and capture whether the vehicle door 6 associated with the outside rearview mirror 2 is opened. This parameter is determined at step S4, and it is checked at step S5 whether the vehicle door 6 is opened. Only when this is the outside rearview mirror 2 folded at step S6; otherwise the outside rearview mirror 2 remains in its unfolded position. Opening of the vehicle door 6 is detected by a door contact switch.

This method according to the invention may, of course, also be carried out for the left outside rearview mirror of the vehicle 1.

With the method according to the invention, the outside rearview mirrors are folded immediately after the ignition is turned off. This is prevented only when an object is detected by the proximity sensor in its detection range, i.e. whether an object approaches the vehicle from behind. In this case, the outside rearview mirror is folded as a function of the third parameter with a time delay, or the outside rearview mirror remains in its unfolded position.

Delayed folding of the exterior mirror depends on the behavior of, for example, the driver, which is detected by the third parameter, i.e., whether the driver leaves, for example, the vehicle seat or opens the vehicle door. In this case, it is assumed that the driver actually intends to leave the vehicle, so that it is reasonable to fold the outside rearview mirror.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

1. A method for controlling an outside rearview mirror of a vehicle to move from an unfolded position to a folded position by using a proximity sensor for detecting of an object in a detection range oriented opposite to the direction of travel of the vehicle, the method comprising the steps of:
   a) Determining a first parameter indicating whether an ignition of a vehicle is turned off,
   b) Determining a second parameter which indicates that an object has been detected in the detection range by the proximity sensor,
   c1) Controllably moving the outside rearview mirror into the folded position, when the first parameter indicates that the ignition is turned off, and the second parameter indicates that no object has been detected in the detection range, or
   c2) Determining a third parameter and controllably moving the outside rearview exterior mirror into the folded position in response to the third parameter, when the first parameter indicates that the ignition is turned off, and the second parameter indicates an object that an object has been detected in the detection range.

2. The method of claim 1, wherein the third parameter indicates whether a vehicle seat associated with the outside rearview exterior mirror is occupied, wherein the outside rearview exterior mirror is controllably moved into the folded position in accordance with step c2) when the third parameter indicates that the vehicle seat is unoccupied.

3. The method of claim 2, wherein occupancy of the vehicle seat is detected by a seat occupancy sensor.

4. The method of claim 1, wherein the third parameter indicates whether a vehicle door associated with the outside rearview exterior mirror is opened or closed, and wherein the outside rearview exterior mirror is controllably moved into the folded position in accordance with step c2) when the third parameter indicates that the vehicle door is opened.

5. The method of claim 4, wherein opening of the vehicle door is detected by a door contact switch.

6. A device for controlling a rearview exterior mirror of a vehicle to move from an unfolded position to a folded position, wherein the vehicle comprises a proximity sensor configured to detect an object in a detection range oriented opposite a direction of travel of the vehicle, wherein the device is configured to
   a) Determine a first parameter indicating whether an ignition of a vehicle is turned off,
   b) Determine in response to a signal for the proximity sensor a second parameter which indicates whether an object has been detected in the detection range,
   c1) Controllably move the outside rearview mirror into the folded position, when the first parameter indicates that the ignition is turned off, and the second parameter indicates that no object has been detected in the detection range, or
   c2) Determine a third parameter and controllably move the outside rearview exterior mirror into the folded position in response to the third parameter, when the first parameter indicates that the ignition is turned off, and the second parameter indicates that an object has been detected in the detection range.

7. The device of claim 6, wherein the vehicle further comprises a seat occupancy sensor configured to detect whether a vehicle seat associated with the outside rearview exterior mirror is occupied, wherein the third parameter indicates that the vehicle seat is unoccupied.

8. The device of claim 6, wherein the vehicle further comprises a door contact switch configured to detect whether a vehicle door associated with the outside rearview exterior mirror is opened or closed, wherein the third parameter indicates that the vehicle door is opened.

\* \* \* \* \*